United States Patent
Houache (10) Patent No.: US 9,244,906 B2
(45) Date of Patent: Jan. 26, 2016

(54) TEXT ENTRY AT ELECTRONIC COMMUNICATION DEVICE

(71) Applicant: Research In Motion Limited, Waterloo (CA)

(72) Inventor: Mohammed Houache, San Diego, CA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 278 days.

(21) Appl. No.: 13/923,464

(22) Filed: Jun. 21, 2013

(65) Prior Publication Data

US 2014/0379325 A1 Dec. 25, 2014

(51) Int. Cl.
*G06F 17/27* (2006.01)
*G06F 3/023* (2006.01)
*G10L 15/26* (2006.01)
*G10L 15/22* (2006.01)

(52) U.S. Cl.
CPC ............ *G06F 17/276* (2013.01); *G06F 3/0237* (2013.01); *G10L 15/26* (2013.01); *G10L 2015/226* (2013.01)

(58) Field of Classification Search
USPC .............................. 704/9, 235, 251–257, 270
See application file for complete search history.

(56) References Cited

U.S. PATENT DOCUMENTS

| 5,502,774 | A | 3/1996 | Bellegarda et al. | |
| 7,143,043 | B1 | 11/2006 | Vandermeijden | |
| 7,467,089 | B2 * | 12/2008 | Roth et al. | 704/270 |
| 8,065,143 | B2 | 11/2011 | Yanagihara | |
| 2008/0195388 | A1 * | 8/2008 | Bower et al. | 704/243 |
| 2011/0208507 | A1 | 8/2011 | Hughes | |
| 2012/0078627 | A1 | 3/2012 | Wagner | |
| 2012/0223889 | A1 * | 9/2012 | Medlock et al. | 345/168 |
| 2013/0046544 | A1 | 2/2013 | Kay et al. | |
| 2014/0108992 | A1 * | 4/2014 | Bi et al. | 715/773 |

FOREIGN PATENT DOCUMENTS

EP 2278581 A1 1/2011

* cited by examiner

*Primary Examiner* — Abul Azad
(74) *Attorney, Agent, or Firm* — Perry + Currier, Inc.

(57) ABSTRACT

Typed input is received at a text field from a keyboard, such as a virtual keyboard displayed at an electronic communication device. Text prediction using the typed input can be performed to obtain at least one text-predicted candidate word and an associated confidence value. Speech recognition can be performed on audio input received via a microphone to obtain at least one speech-recognized candidate word and an associated confidence value, which can be adjusted based on the recency of the audio input. A candidate word having a highest confidence value can be selected from the text-predicted and speech-recognized candidate words for display as a suggestion to the user for selection by the user. The suggested candidate word can be displayed on a fret of the virtual keyboard.

18 Claims, 5 Drawing Sheets

TEXT ENTRY AT ELECTRONIC COMMUNICATION DEVICE

FIELD

This disclosure relates to electronic communication devices, and more specifically, to text entry at electronic communication devices.

BACKGROUND

Text entry using keyboards of electronic communication devices can be subject to error, which can reduce typing speed and generally reduce the effectiveness of text entry and of communications. Such error is particularly evident in touch-screen virtual keyboards.

Many schemes exist to correct errors in text typed with a keyboard. Word auto-correction and auto-completion are known. However, many of such schemes do not typically use information other than keyboard key presses, and those that do use such information do so in a subordinate manner, yielding precedence and control to the auto-correction or auto-completion algorithm. Further, such schemes do not typically work with context-based keyboard text prediction.

BRIEF DESCRIPTION OF THE DRAWINGS

The drawings illustrate, by way of example only, embodiments of the present disclosure.

DETAILED DESCRIPTION

This disclosure relates to using text prediction, such as auto-correction, auto-completion, or disambiguation, and speech recognition to facilitate fast and simplified typed text entry by offering suggestions of candidate words based on both of text prediction and speech recognition. Candidate words from each of text prediction and speech recognition are assigned confidences and the candidate word(s) with the greatest confidence are selected. Speech-recognized candidate words can have their confidences adjusted based on the recency (or latency) of the underlying utterance. This disclosure thus teaches a technique that processed speech-recognized candidate words using the same logic as text-recognized candidate words, which can advantageously improve the effectiveness and speed of typed text entry.

Speech recognition can be applied to any captured voice, such as the voice of a keyboard user who may speak as they type, the voice of another speaker such as a lecturer or presenter, or the voice of someone engaged in a conversation with the keyboard user. Other scenarios include typing of driving directions, note-taking, typing a to-do list, transcribing dialog or interviews, and similar.

Figure 1:
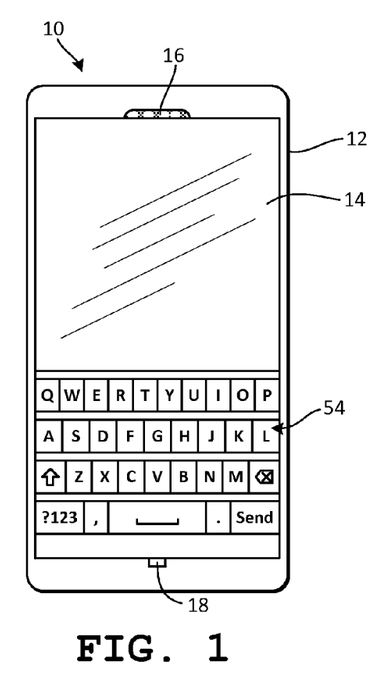
FIG. 1 is a front view of an electronic communication device.

FIG. 1 shows an electronic communication device 10 according to embodiments of the present disclosure.

The electronic communication device 10 includes a housing 12, a display 14, a speaker 16, and a microphone 18. The housing 12 is sized and shaped to be carried and used with one or two hands and may include materials such as plastic and aluminum. The display 14 is mounted to or inside the housing 12 and is configured to display output of the electronic communication device 10. The display 14 may include touch-sensitive layers or elements for receiving user input, and may be referred to as a touch-screen. The speaker 16 is connected to the housing 12 and is configured to output audio, such as voice from telephone conversations, music, and the like. The microphone 18 is connected to the housing 12 and is configured to receive input of voice, such as from the user of the electronic communication device 10 or nearby individuals, ambient sound, and similar.

Figure 2:
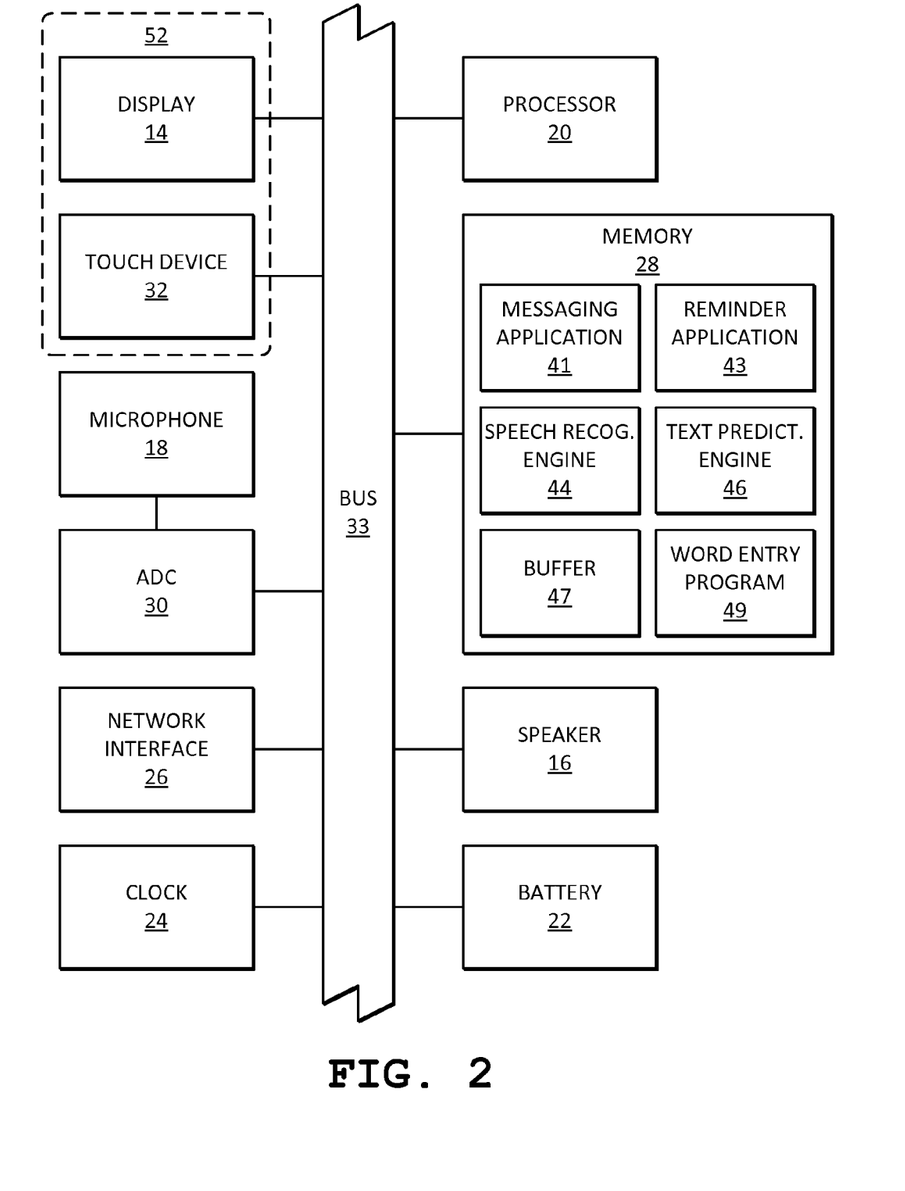
FIG. 2 is a block diagram of the electronic communication device.

Referring to FIG. 2, in some embodiments, the electronic communication device 10 further includes a processor 20, a power source 22 (e.g., a battery), a clock 24, a network interface 26, memory 28, an analog-to-digital converter (ADC) 30, and a touch-sensitive device 32. The components of the electronic communication device 10 can be mutually connected by way of a bus 33, which can be configured to communicate digital signals and convey power.

The processor 20 is configured to execute instructions, which may originate from the memory 28 or the network interface 26. The processor 20 may be known as a central processing unit (CPU), microprocessor, or similar. The processor 20 can include one or more sub-processors or processing cores.

The power source 22 can include a battery and related charging circuitry, or similar, so as to allow cord-free use of the electronic communication device 10 for at least some duration of time.

The clock 24 can include a clock circuit that tracks a current time. The clock may be configurable to receive updates to the current time from a remote time source accessible via the network interface 26.

The network interface 26 is configured to allow the electronic communication device 10 to communicate with other similar devices, as well as remote computers or services, over a network. The network interface 26 can include one or more of a wired and wireless network adaptor and well as a software or firmware driver for controlling such adaptor. Multiple different network interfaces 26 can be provided for connection to different types of networks, such as cellular networks, WiFi networks, and the like.

The ADC 30 is configured to receive analog audio signals from the microphone 18 or other audio source and convert such signals to digital signals. The ADC 30 may include the capability to filter or process signals, so as to reduce noise or prepare signals for speech recognition, and may include elements of a digital signal processor.

The memory 28 includes a non-transitory computer-readable medium that is configured to store programs or applications and data. The memory 28 can include one or more short-term or long-term storage devices, such as a solid-state memory chip (e.g., DRAM, ROM, non-volatile flash memory), a hard drive, an optical storage disc, and similar. The memory 28 can include fixed components that are not physically removable from the device 10 (e.g., fixed memory chips) as well as removable components (e.g., removable memory cards). The memory 28 allows for random access, in that programs and data may be both read and written.

A messaging application 41 is stored in the memory 28 and is configured to allow the electronic communication device 10 to communicate messages with a remote device or other computer, accessible via the network interface 26. Such messages include text and may include graphics. Examples of suitable messaging applications include an email application, an instant messaging application, a short message service (SMS) application, a micro-blogging application, a social network application, and similar.

A reminder application 43 is stored in the memory 28 and is configured to allow the electronic communication device 10 to issue reminder alerts to the user or another user via the display 14 or the network interface 26. Such reminder alerts are configured to display text previously entered by the user.

Other applications may also be provided, with the messaging application 41 and the reminder application 43 being but two examples. Other examples of applications that typically receive input of text include a note-taking application, a document creation/editing application, and a calendar application.

A speech-recognition engine 44 is stored in the memory 28 and is configured to process captured and digitized audio received from the microphone 18 and ADC 30. The speech-recognition engine 44 outputs words or other elements of language (e.g., digits, punctuation, paragraph marks, etc.) in the form of text. For a given utterance, the speech-recognition engine 44 can output one or more candidate words along with an associated confidence value. Confidence values are indicative of the inherent error in analog voice capture (e.g., signal-to-noise ratio, audible background noise, etc.), digitization, and the matching of digitized audio signals to stored signals indicative of words. Confidence values can be calculated by the speech-recognition engine 44 based on the particular algorithm employed. The speech-recognition engine 44 can reference dictionaries and grammars, as well as historical data for past matches.

A text-prediction engine 46 is stored in the memory 28 and is configured to process typed input receive at the touch-sensitive device 32. For a given input string of characters, the text-prediction engine 46 can output one or more candidate words along with an associated confidence value. Confidence values may vary based on the type of text prediction performed (e.g., auto-correction, auto-completion, disambiguation, etc.) and can be calculated based on the particular algorithm employed. The text-prediction engine 46 can reference dictionaries and grammars, as well as historical data for past predictions.

A buffer 47 is a designated portion of the memory 28 in which suggested candidate words are stored before final selection by the user. Each of the speech-recognition engine 44 and the text-prediction engine 46 can employ similar buffers for their wider sets of candidate words.

A word entry program 49 is stored in the memory to implement the processes and systems described herein for selecting candidate words based on text prediction and speech recognition. The word entry program 49 may be implemented as an application programming interface (API), a function, a class, a module, or similar programmatic entity. The word entry program 49 references the engines 44, 46 and can send and receive data to and from the engines 44, 46. The word entry program 49 is configured to provide output to the buffer 47.

The touch-sensitive device 32 and the display 14 cooperate to form a touch-screen 52. With reference again to FIG. 1, the touch-screen 52 may be configured to display a virtual keyboard 54 and receive input of key presses.

Figure 3:
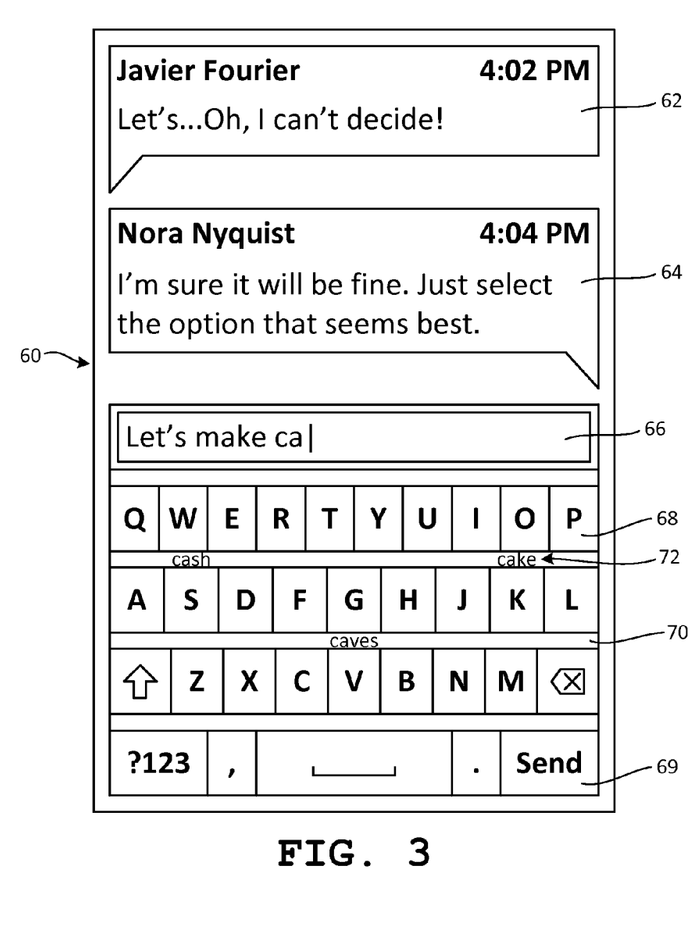
FIG. 3 is a schematic diagram of a messaging interface of the electronic communication device.

FIG. 3 shows an interface for receiving input of text at the electronic communication device 10. In this example, the interface is a messaging interface 60. Other examples of suitable interfaces include interfaces configured for input of text for reminders, notes, documents, meetings or appointments, and similar. Any of such interfaces can be configured for relatively quick entry of text, as will be discussed with respect to the example messaging interface 60.

The messaging interface 60 can include one or more message elements 62, 64, which can each identify, via text or graphic, the sender of a particular message and the time that the message was received at (or sent to) the electronic communication device 10, in addition to the textual message content.

The messaging interface 60 can further include a text field 66 configured to receive text input from the virtual keyboard 54, which includes letter keys 68, punctuation and other keys, and an enter or send key 69 that triggers commitment of text entry. The virtual keyboard 54 can further include frets 70 located between rows of keys to vertically separate rows of keys. In the example of the messaging interface 60, the text field 66 is configured to receive text input of a message to send to the remote correspondent, with sending of the entered message being initiated by the send key 69.

The messaging interface 60 connects to the text-prediction engine 46 (FIG. 2) to perform text prediction using input typed into the text field 66 to obtain at least one text-predicted candidate word. A text-predicted candidate word can be a completion of a word currently being typed, a correction to a word completely or partially typed, a disambiguation of similar words, and the like, and can reference historic typing habits as well as context. A plurality of such text-predicted candidate words can be obtained.

The messaging interface 60 further connects to the speech-recognition engine 44 (FIG. 2) to perform speech recognition using a stream of audio input collected by the microphone 18 to obtain at least one speech-recognized candidate word. A plurality of such speech-recognized candidate words can be obtained.

Each candidate word, whether from the text-prediction engine 46 or the speech-recognition engine 44, is accompanied by a confidence value that indicates a probability that the candidate word is the word intended to be inputted by the user. The confidence value can be expressed as such or can, alternatively and equivalently, be expressed as an error value that indicates a probability that the candidate word is not the intended word. For sake of clarity, confidence values will be discussed herein as ranging from zero (i.e., the candidate word is not the intended word) to one (i.e., the candidate word is the intended word).

Confidence values of candidate words from the speech-recognition engine 44 can be reduced as time passes. That is, the less recent a spoken word is, the less likely it is relevant to the word being typed.

One or more candidate words having the highest confidence values are selected and displayed at the messaging interface 60 as one or more suggested candidate words that are selectable to the user.

In some embodiments, suggested candidate words 72 are displayed superimposed on the virtual keyboard 54, at locations on the frets 70 of the virtual keyboard 54. In such embodiments, the virtual keyboard 54 is configured to receive presses or flicks (e.g., vertical swipes) at such locations to trigger entry of the respective candidate word 72. Candidate words 72 for display on the frets 70 can be selected such that each candidate word 72 is displayed above the key having the letter that would have to be typed to continue or complete entering such word. For example, if "ca" is currently typed, then the word "cake" may appear above the "k" key because the letter "k" is the next letter in the word. Similarly, the word "cash" may appear above the "s" key and the word "caves" may appear above the "v" key.

In other embodiments, suggested candidate words 72 can be displayed at other locations, such as in a row above the virtual keyboard 54 and below the text field 66.

Figure 4:
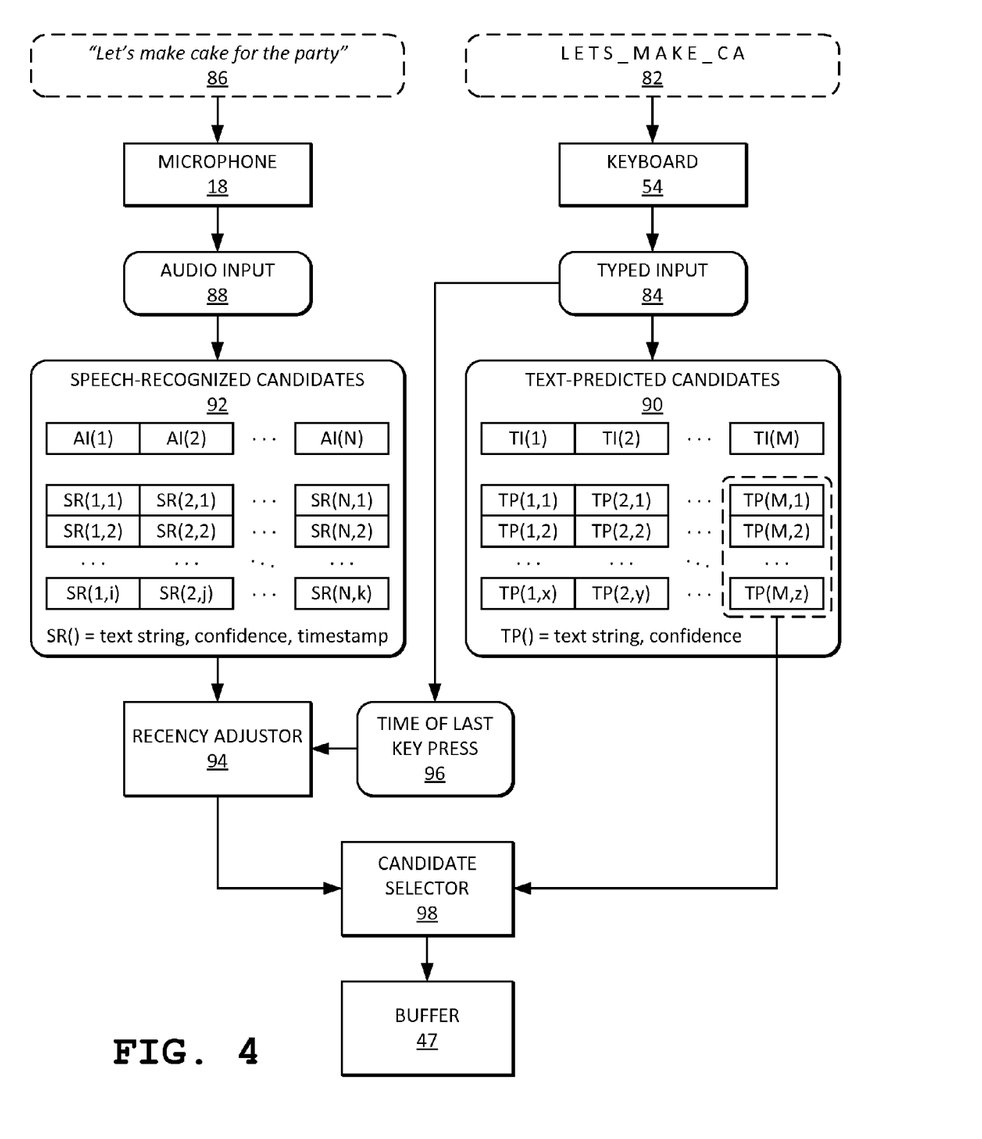
FIG. 4 is a block diagram of word entry at the electronic communication device.

FIG. 4 illustrates the above-described text entry in greater detail.

Key presses 82 at the keyboard 54 are received as typed input 84 in a process that may inherently include key-position disambiguation or other error compensation at the keyboard 54. Such typed input 84 can be received at a text field, such as the text field 66 (FIG. 3).

Audio 86 is received at the microphone 18 and processed by, for example, the ADC 30 (FIG. 2) to obtain digitized audio input 88. Such audio can be from any source, such as the voice of the user of the electronic communication device 10 or the voice of another person, and the microphone 18 and ADC 30 do not discriminate.

Typed input 84 is processed by the text-prediction engine 46, which uses the typed input 84 to obtain at least one text-predicted candidate word and confidence values for such words, as indicated at 90. In some embodiments, as it is entered, the typed input 84 is segmented into any number (e.g., 1, 2, . . . , M) of words or apparent words, TI( ), with the word currently being typed indicated as TI(M). Segmentation can be triggered, for example, by entry of a word delimiting character, such as a space, certain punctuation marks, and the like. Each word, TI( ), is processed by the text-prediction engine 46 to obtain any number (e.g., 1, 2, . . . , x) of candidate words and associated confidence values, designated as TP( ), which is indexed to the respective as-typed word TI( ). Candidate words may be expressed as text strings and confidence values may be expressed as floating-point values, integer values, or the like. Thus, the word TI(1) is associated with x candidate words and associated confidence values, TP(1, 1 . . . x), and so on until the word currently being typed, TI(M), which is associated with z candidate words and associated confidence values, TP(M, 1 . . . z). Only one set of candidate words and associated confidence values TP(M, 1 . . . z) for the currently typed word is required, with candidate words being kept for contextual text prediction, if desired.

Audio input 88 is processed by the speech-recognition engine 44, which uses the audio input 88 to obtain at least one speech-recognized candidate word and confidence values for such words, as indicated at 92. In some embodiments, audio input 88 is segmented into any number (e.g., 1, 2, . . . , N) of words or apparent words, AI( ), as captured and digitized by the microphone 18 and the ADC 30. The most recently captured word is indicated as AI(N) and the oldest captured word still stored is indicated as AI(1). Segmentation can be triggered, for example, by low signal-to-noise values indicative of pauses or silence or by similar techniques. Each captured and digitized word, AI( ) is processed by the speech-recognition engine 44 to obtain any number (e.g., 1, 2, . . . , i) of candidate words, associated confidence values, and timestamps, together designated as SR( ), which is indexed to the respective captured and digitized word AI( ). Candidate words may be expressed as text strings, confidence values may be expressed as floating-point values, integer values, or the like, and timestamps may be absolute (e.g., YYYY-MM-DD HH:MM:SS) or relative (e.g., a number of seconds as measured from the beginning of the captured audio stream). Each timestamp may be obtained from the clock 24 (FIG. 2) and may indicate a time of receiving the respective portion of the audio input 88, and specifically the end of the utterance, that corresponds to the respective captured and digitized word AI( ). Thus, the inputted word AI(1) is associated with i candidate words and associated confidence values and timestamps, SR(1, 1 . . . i), and so on until the word most recently captured and digitized, AI(N), which is associated with k candidate words and associated confidence values and timestamps, SR(N, 1 . . . k).

A recency adjustor 94 can be provided to increase or decrease confidence values of speech-recognized candidate words based on a comparison of the respective timestamps with a time of receiving a most recent portion of the typed input, such as a time of last key press 96. When a key is pressed to add to the typed input, the time of last key press 96 is updated, with reference to the clock 24 (FIG. 2), so as to track the relative recency of audio input 88 with respect to typed input 84.

A confidence value of a speech-recognized candidate word may be increased when the respective timestamp is within a threshold amount of a time of last key press 96. That is, recency of audio is determined to increase the relevance of the audio to the text being typed. For example, the user typing the text may have uttered the word being typed a few seconds prior. In another example, the user may be engaged in a conversation with another person while typing. Examples of threshold amounts include 20 seconds, 5 seconds, 1 second, and 0.5 seconds, and several threshold levels may be applied to proportionally increase a confidence value. For example, a speech-recognized candidate word having a recency of 1 second or less has its confidence value increased by a larger amount than does a speech-recognized candidate word having a recency of between 1 and 5 seconds.

Later utterances may be indicative of a user saying the word that s/he is attempting to type. Hence, a confidence value of a speech-recognized candidate word may be increased when the respective timestamp is after a time of last key press 96. One or more threshold amounts can be used, so that speech-recognized candidate words closer in time to the last key press 96 have confidence values increased by a larger margin. For example, the user uttering the word "cake" 1 second after typing the letters "ca" causes an increase in the respective confidence value, and such an increase can be configured to be greater than the user uttering the word "cake" 15 seconds after typing the letters "ca", when such letters are the most recently typed.

Conversely to the above, a confidence value of a speech-recognized candidate word may be decreased when the respective timestamp is a threshold amount earlier than the time of last key press 96. That is, latency of audio is determined to decrease the relevance of the audio to the text being typed. Examples of threshold amounts include those mentioned above, and several threshold levels may be applied to proportionally decrease a confidence value. For example, a speech-recognized candidate word having a latency of 10 seconds or more has its confidence value decreased by a larger amount than does a speech-recognized candidate word having a recency of between 5 and 10 seconds.

A candidate selector 98 is configured to select one or more candidate words having the highest confidence value(s) from the text-predicted and speech-recognized candidate words, after any recency adjustment is made to speech-recognized candidate words. The text-predicted candidate words are those words TP(M, 1 . . . z) most recently determined for the most recently typed word or portion thereof (i.e., letter or character).

The candidate selector 98 may be configured to reduce the number of speech-recognized candidate words by performing a pre-selection process that keeps only those speech-recognized candidate words that match at least a portion of the typed input 84. That is, one or more initial characters of the most recent as-typed word TI(M) are compared to the same number of initial characters of the recency-adjusted speech-recognized candidate words SR(1, 1) to SR(N,k), and only those speech-recognized candidate words whose initial characters meet a matching condition are considered for selection. For example, if the most recent as-typed word TI(M) is "ca", then speech-recognized candidate words "cake" and "cape" would be considered for selection, while speech-recognized candidate words "Kate" and "cute" would not be considered for selection. Example matching conditions include: first letter must match, at least one of two initial letters must match, both of two initial letters must match, etc.

The suggested candidate word or words are then entered into the text buffer 47. The text buffer 47 may be referenced by the virtual keyboard 54 when providing candidate words 72 for user selection, such as on the frets 70. In this way, both audio information and typed input are used to provide candidate words available to the user as s/he types, which can advantageously speed the entry of words into the electronic communication device 10 and reduce errors.

The recency adjustor 94, the stored time of last key press 96, and the candidate selector 98 may form part of the word entry program 49 (FIG. 2), along with additional functionality described with respect to processing the speech-recognized candidates 92, such as timestamping, if such functionality is not provided for by the speech-recognition engine 44.

Figure 5:
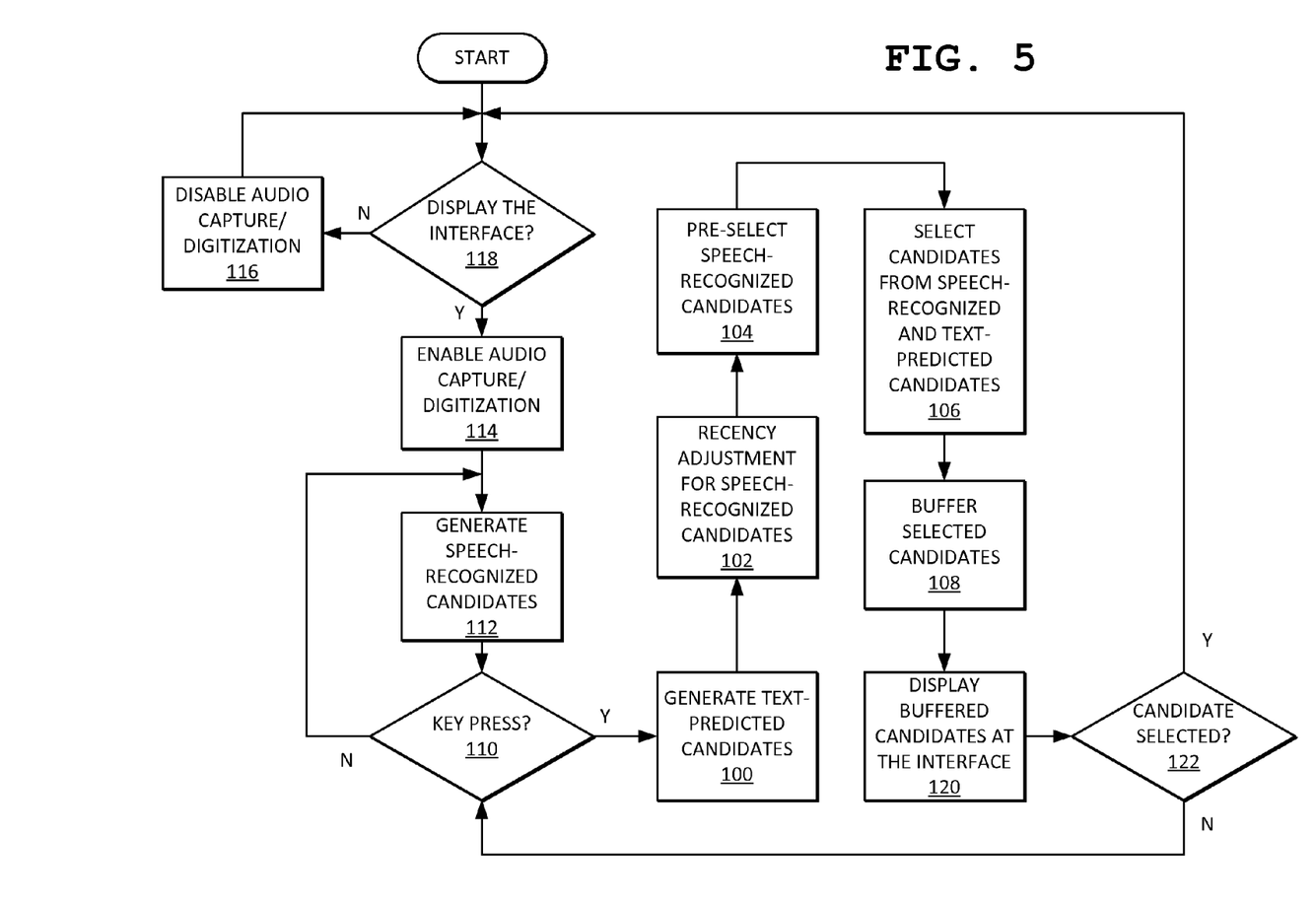
FIG. 5 is a flowchart of a process for word entry at the electronic communication device.

With reference to the flowchart of FIG. 5, the performance of text prediction (at 100) to obtain updated most-recent candidate words TP(M, 1 . . . z), the recency adjustment (at 102) of speech-recognized candidate words SR( ), the pre-selection (at 104) of speech-recognized candidate words, the selection (at 106) of candidate words based on confidence value, and the entering (at 108) of suggested candidate words into the buffer 47 can be triggered in response to receiving each character of typed input 84 (at 110). That is, the candidate words 72 displayed to the user for selection are updated as each key is pressed. It should be mentioned that, the speech-recognized candidate words SR( ) are also updated (at 112) as a background process. This includes dropping older speech-recognized candidate words SR( ), if appropriate, to save memory. However, updating of the speech-recognized candidate words SR( ) is performed based on whether audio capture is enabled (at 114), rather than being triggered by a new character being typed (at 110).

Whether or not audio capture and speech recognition is enabled (at 114) or disabled (at 116) can be determined by whether the text-entry interface (e.g., messaging interface 60) is displayed or not (at 118). Thus, streaming audio capture, digitization, and speech recognition can be turned off when not needed.

Buffered candidate words are displayed (at 120) to the user for selection via the interface, such as on the frets 70 of the virtual keyboard 54. When a buffered candidate word is selected (at 122) for commitment to the text field 66 (FIG. 3), the process returns to 118 to determine whether the interface is still displayed, as it is contemplated that some kinds of interfaces will automatically close after text entry. When a buffered candidate word is not selected, the process returns to 110 to monitor for the next key press.

The process shown in FIG. 5 is merely a descriptive example. It should be apparent that actions can be reordered or combined. Further, in many implementations, such as those using objects and classes, methods and their triggering events are used instead of a flow-type process.

Figure 6:
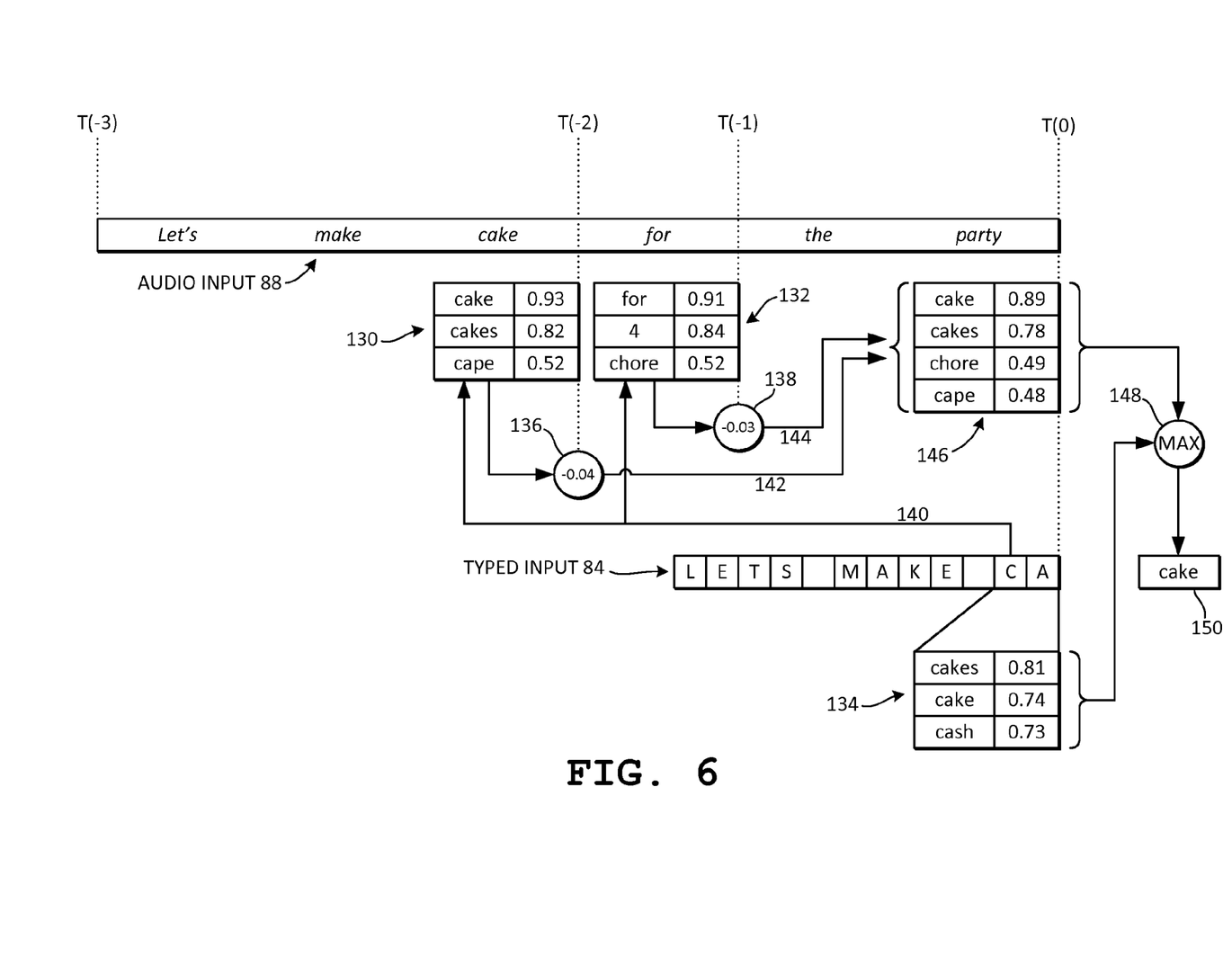
FIG. 6 is a schematic diagram of a process for word entry at the electronic communication device.

FIG. 6 shows an example of execution of a process for word entry in the context of the components, processes, and examples described above.

In the example shown, from time T(−3) to the current time, T(0), a stream of digitized audio input 88 is captured and processed. During about the same time, typed input 84 is received from the keyboard 54. At the current time, T(0), an entire sentence has been uttered and captured, while only a portion of the sentence has been typed.

Speech-recognized candidate words for each word of the utterance have been obtained. For clarity, only those relevant to the example are illustrated. A set of candidate words 130 for the spoken word ending at about time T(−2) and a set of candidate words 132 for the spoken word ending at about time T(−1) are determined. Each of the speech-recognized candidate words is associated with a confidence value.

Text-predicted candidate words 134 for the most recently typed word or portion thereof are also determined. Each of the text-predicted candidate words is associated with a confidence value.

The time of last key press is taken for time T(0) and recency adjustment values 136, 138 are determined for times T(−2) and T(−1), as well as for times of other utterances (not shown for clarity) based on the difference between T(0) and the respective time T(−2) or T(−1).

Then, one or more of the speech-recognized candidate words are pre-selected, at 140, based on at least a portion of the typed input, which in this example is the first letter (e.g., "C") that follows the most recently typed word delimiter. Thus, only speech-recognized candidate words beginning with the letter "C" are considered. This eliminates likely unrelated words that nevertheless have high confidence and recency (e.g., "for"). The remaining speech-recognized candidate words have their confidence values adjusted, at 142, 144, by the respective recency adjustment value 136, 138. Thus, in the example shown, the remaining speech-recognized candidate words "cake", "cakes", and "cape" have their confidence values reduced by 0.04, while the remaining speech-recognized candidate word "chore" has its confidence value reduced by 0.03. The result is a set of pre-selected recency-adjusted and speech-recognized candidate words 146.

At 148, from such speech-recognized candidate words 146 and the text-predicted candidate words 134, one or more candidate words 150 having the highest confidence values are selected for display to the user as suggested words for selection by the user. In this example, the word "cake" is selected because its confidence value, as determined by speech recognition (and despite a reduction for latency), is greater than that of the word "cakes" supplied by the text prediction engine. Hence, the intended word can be readily selected and it is unnecessary for the user to type the remaining letters of the word. This is advantageous, in that key presses and time are saved. This is further advantageous in interfaces (e.g., FIG. 3) where only one word is presented for a particular possible next letter (e.g., only "cake" or "cakes" is presented for the possible next letter "k") because such systems may choose the longer word due to other reasons (e.g., typing history, apparent context), and it can be particularly inefficient and frustrating for a user to have to type the remaining letters of the intended word without unintentionally selecting the longer word being offered as a shortcut.

Further, it should be noted that several candidate words 150 can be selected based on confidence value. However, a further constraint can be placed on such selection in interfaces where only one word is presented for a particular possible next letter, such as with the frets 70 of the virtual keyboard 54 (FIG. 3). Thus, the candidate word "cash" is selected in addition to "cake", despite the word "cash" having a lower confidence than the word "cakes", which is not selected due to the logic governing the frets 70.

As evident from the above, the present disclosure provides for a quick and effective way to enter text, such as words, into an electronic communication device using both text prediction and speech recognition. The efficiency of text entry, particularly when using virtual keyboards, can be increased.

In other embodiments, a physical keyboard is used, alternatively to or in addition to, a virtual keyboard.

In further embodiments, an electronic device, such as a computer, is used instead of an electronic communication device.

According to one aspect of this disclosure, a method of facilitating text entry at an electronic communication device includes receiving typed input at a text field from a keyboard of the electronic communication device, receiving audio input at the electronic communication device, performing text prediction using the typed input to obtain at least one text-predicted candidate word and an associated confidence value, performing speech recognition using the audio input to obtain at least one speech-recognized candidate word and an associated confidence value, selecting from the text-predicted and speech-recognized candidate words a candidate word having a highest associated confidence value as a suggested candidate word, and entering the suggested candidate word into a text buffer of the electronic communication device.

According to another aspect of this disclosure, an electronic communication device includes a display, a microphone and connected analog-to-digital converter (ADC), memory, and a processor connected to the display, the ADC, and the memory. The processor is configured to output a virtual keyboard to the display, receive typed input from the keyboard, and perform text prediction using the typed input to obtain at least one text-predicted candidate word and an associated confidence value. The processor is further configured to receive audio input from the ADC, and perform speech recognition using the audio input to obtain at least one speech-recognized candidate word and an associated confidence value. The processor is further configured to select a candidate word having a highest confidence value from the text-predicted and speech-recognized candidate words as a suggested candidate word, and store the suggested candidate word in the memory.

According to another aspect of this disclosure, a method of facilitating text entry at an electronic communication device includes receiving typed input from a virtual keyboard, receiving a stream of digitized audio input, performing text prediction on a most recent word or word portion of the typed input to obtain at least one text-predicted candidate word and an associated confidence value, and performing speech recognition on the audio input to obtain at least one speech-recognized candidate word and an associated confidence value. The confidence value of the speech-recognized candidate word is based at least in part on a recency of a respective portion of the audio input as compared to a time of receiving the word or word portion of the typed input. The method further includes selecting from the text-predicted and speech-recognized candidate words a candidate word, as a suggested candidate word, based on the associated confidence values.

A portion of the audio input corresponding to a particular speech-recognized candidate word can be received before receiving a most recent portion of the typed input.

The confidence value of the particular speech-recognized candidate word can be determined by referencing an amount of time that the particular speech-recognized candidate word is received before the most recent portion of the typed input.

A portion of the audio input corresponding to a particular speech-recognized candidate word can be received after receiving a most recent portion of the typed input.

The confidence value of the particular speech-recognized candidate word can be determined by referencing an amount of time that the particular speech-recognized candidate word is received after receiving the most recent portion of the typed input.

The confidence value of the particular speech-recognized candidate word can be decreased as the amount of time increases.

The speech-recognized candidate word can be obtained by performing a pre-selection from a plurality of speech-recognized candidate words based on at least a portion of the typed input.

The portion of the typed input can include an initial character of a word.

The text prediction, the selecting, and the entering can be triggered in response to receiving each character of the typed input.

The selecting can include selecting from the text-predicted and speech-recognized candidate words a plurality of candidate words having highest associated confidence values, as suggested candidate words.

The suggested candidate words can be displayed as user-selectable on a display of the electronic communication device.

At least two of the suggested candidate words can be displayed as superimposed on a virtual keyboard.

A user selection of one of the suggested candidate words can be received.

The speech recognition can be performed as a background process, and the text prediction and the selecting can be performed in response to a key press at the virtual keyboard.

According to another aspect of this disclosure, non-transitory computer-readable medium contains a program that when executed by a processor of an electronic communication device configures the processor to perform any one of the above methods.

While the foregoing provides certain non-limiting example embodiments, it should be understood that combinations, subsets, and variations of the foregoing are contemplated. The monopoly sought is defined by the claims.

What is claimed is:

1. A method of facilitating text entry at an electronic communication device, the method comprising:
   receiving typed input at a text field from a keyboard of the electronic communication device;
   receiving audio input at the electronic communication device;
   performing text prediction using the typed input to obtain at least one text-predicted candidate word and an associated confidence value;
   performing speech recognition using the audio input to obtain at least one speech-recognized candidate word and an associated confidence value;
   selecting from the text-predicted and speech-recognized candidate words a candidate word having a highest associated confidence value, as a suggested candidate word; and, one of:
      receiving a portion of the audio input corresponding to a particular speech-recognized candidate word before receiving a most recent portion of the typed input; and, determining the confidence value of the particular speech-recognized candidate word by referencing an amount of time that the particular speech-recognized candidate word is received before the most recent portion of the typed input, the confidence value of the particular speech-recognized candidate word decreasing as the amount of time increases; or, receiving the portion of the audio input corresponding to the particular speech-recognized candidate word after receiving the most recent portion of the typed input and, determining the confidence value of the particular speech-recognized candidate word by referencing an amount of time that the particular speech-recognized candidate word is received after receiving the most recent portion of the typed input, the confidence value of the particular speech-recognized candidate word decreasing as the amount of time increases.

2. The method of claim 1, further comprising obtaining the speech-recognized candidate word by performing a pre-selection from a plurality of speech-recognized candidate words based on at least a portion of the typed input.

3. The method of claim 2, wherein the portion of the typed input comprises an initial character of a word.

4. The method of claim 1, further comprising triggering the text prediction, the selecting, and the entering in response to receiving each character of the typed input.

5. The method of claim 1, wherein the selecting comprises selecting from the text-predicted and speech-recognized candidate words a plurality of candidate words having highest associated confidence values, as suggested candidate words.

6. The method of claim 5, further comprising displaying the suggested candidate words as user-selectable on a display of the electronic communication device.

7. The method of claim 6, further comprising displaying at least two of the suggested candidate words superimposed on a virtual keyboard.

8. The method of claim 6, further comprising receiving a user selection of one of the suggested candidate words.

9. The method of claim 1, further comprising entering the suggested candidate word into a text buffer of the electronic communication device.

10. A non-transitory computer-readable medium storing a computer program, wherein execution of the computer program is for: facilitating text entry at an electronic communication device by:
receiving typed input at a text field from a keyboard of the electronic communication device;
receiving audio input at the electronic communication device;
performing text prediction using the typed input to obtain at least one text-predicted candidate word and an associated confidence value;
performing speech recognition using the audio input to obtain at least one speech-recognized candidate word and an associated confidence value;
selecting from the text-predicted and speech-recognized candidate words a candidate word having a highest associated confidence value, as a suggested candidate word; and, one of:
receive a portion of the audio input corresponding to a particular speech-recognized candidate word before receiving a most recent portion of the typed input; and determining the confidence value of the particular speech-recognized candidate word by referencing an amount of time that the particular speech-recognized candidate word is received before the most recent portion of the typed input, the confidence value of the particular speech-recognized candidate word decreasing as the amount of time increases; or,
receive the portion of the audio input corresponding to the particular speech-recognized candidate word after receiving the most recent portion of the typed input; and, determining the confidence value of the particular speech-recognized candidate word by referencing an amount of time that the particular speech-recognized candidate word is received after receiving the most recent portion of the typed input, the confidence value of the particular speech-recognized candidate word decreasing as the amount of time increases.

11. The non-transitory computer-readable medium of claim 10, wherein execution of the computer program is further for: entering the suggested candidate word into a text buffer of the electronic communication device.

12. An electronic communication device comprising:
a display;
a microphone and connected analog-to-digital converter (ADC);
memory; and
a processor connected to the display, the ADC, and the memory, the processor configured to:
output a virtual keyboard to the display;
receive typed input from the keyboard, and perform text prediction using the typed input to obtain at least one text-predicted candidate word and an associated confidence value;
receive audio input from the ADC, and perform speech recognition using the audio input to obtain at least one speech-recognized candidate word and an associated confidence value;
select a candidate word having a highest confidence value from the text-predicted and speech-recognized candidate words, as a suggested candidate word; and, one of:
receiving a portion of the audio input corresponding to a particular speech-recognized candidate word before receiving a most recent portion of the typed input; and, determining the confidence value of the particular speech-recognized candidate word by referencing an amount of time that the particular speech-recognized candidate word is received before the most recent portion of the typed input, the confidence value of the particular speech-recognized candidate word decreasing as the amount of time increases; or,
receiving the portion of the audio input corresponding to the particular speech-recognized candidate word after receiving the most recent portion of the typed input; and, determining the confidence value of the particular speech-recognized candidate word by referencing an amount of time that the particular speech-recognized candidate word is received after receiving the most recent portion of the typed input, the confidence value of the particular speech-recognized candidate word decreasing as the amount of time increases.

13. The electronic communication device of claim 12, wherein the processor is further configured to store the suggested candidate word in the memory.

14. A method of facilitating text entry at an electronic communication device, the method comprising:
receiving typed input from a virtual keyboard;
receiving a stream of digitized audio input;
performing text prediction on a most recent word or word portion of the typed input to obtain at least one text-predicted candidate word and an associated confidence value;
performing speech recognition on the audio input to obtain at least one speech-recognized candidate word and an associated confidence value, the confidence value of the speech-recognized candidate word being based at least in part on a recency of a respective portion of the audio input as compared to a time of receiving the word or word portion of the typed input;

selecting from the text-predicted and speech-recognized candidate words a candidate word, as a suggested candidate word, based on the associated confidence values; and, one of:

receiving a portion of the audio input corresponding to a particular speech-recognized candidate word before receiving a most recent portion of the typed input; and, determining the confidence value of the particular speech-recognized candidate word by referencing an amount of time that the particular speech-recognized candidate word is received before the most recent portion of the typed input, the confidence value of the particular speech-recognized candidate word decreasing as the amount of time increases; or, receiving the portion of the audio input corresponding to the particular speech-recognized candidate word after receiving the most recent portion of the typed input; and, determining the confidence value of the particular speech-recognized candidate word by referencing an amount of time that the particular speech-recognized candidate word is received after receiving the most recent portion of the typed input, the confidence value of the particular speech-recognized candidate word decreasing as the amount of time increases.

15. The method of claim 14, further comprising pre-selecting speech-recognized candidate words based on a match with the most recent word or word portion of the typed input.

16. The method of claim 14, further comprising displaying the suggested candidate word superimposed on a virtual keyboard.

17. The method of claim 14, comprising performing the speech recognition as a background process and performing the text prediction and the selecting in response to a key press at the virtual keyboard.

18. The method of claim 14, further comprising storing the suggested candidate word in a memory of the electronic communication device.

* * * * *